United States Patent [19]

Lewis

[11] Patent Number: 4,787,173
[45] Date of Patent: Nov. 29, 1988

[54] TREE COVERING AND METHOD OF USING THE SAME

[76] Inventor: Gene R. Lewis, Rte. 1, Box 284, Orland, Ind. 46776

[21] Appl. No.: 912,089

[22] Filed: Sep. 29, 1986

[51] Int. Cl.⁴ ............................................. A01G 13/02
[52] U.S. Cl. ......................................... 47/21; 135/90; 135/905
[58] Field of Search ................... 47/20, 21, 22, 26, 27

[56] References Cited

U.S. PATENT DOCUMENTS

| | | | |
|---|---|---|---|
| 385,389 | 7/1888 | Titus | 47/20 |
| 633,528 | 9/1899 | Morris | 47/21 |
| 916,762 | 3/1909 | McFadden | 47/21 |
| 1,126,426 | 1/1915 | Eddy | 47/21 |
| 1,820,040 | 8/1931 | Zuckerman | 47/22 |

Primary Examiner—Richard J. Johnson
Attorney, Agent, or Firm—Price, Heneveld, Cooper, DeWitt & Litton

[57] ABSTRACT

A covering for a tree including a flexible fabric envelope having a closed top and an open bottom, the bottom being held open at all times during use by means of a relatively rigid ring. The cover is placed on the tree through use of a ring affixed to the top thereof. It is removed in a "reverse peeling" fashion by raising the rigid ring upwardly. The cover is sized so that the ring is in contact with the ground surrounding the tree during use.

5 Claims, 2 Drawing Sheets

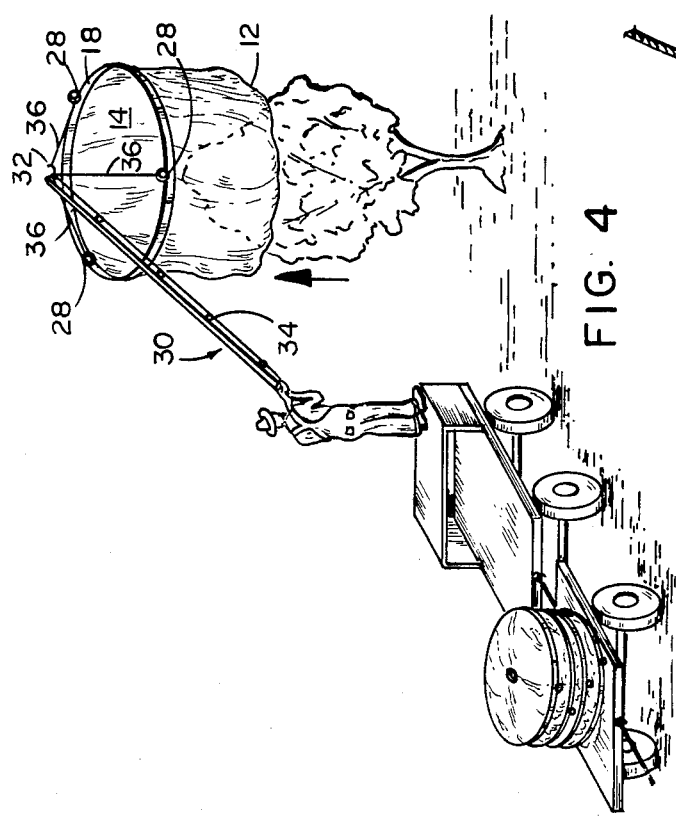
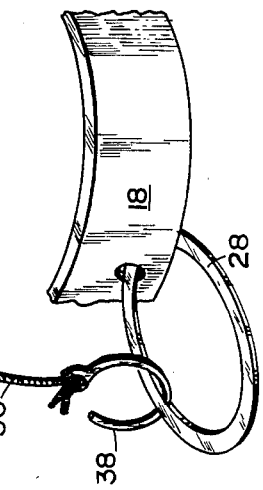
FIG. 5
FIG. 6
FIG. 4 the top with means permanently (in the sense the means is not removed after installation of the covering) fixed to the envelope around the open bottom thereof for holding it open. Lifting means are provided on the closed top of the envelope from which the covering can be suspended above a tree.

TREE COVERING AND METHOD OF USING THE SAME

BACKGROUND OF THE INVENTION

This invention relates to tree coverings and, more particularly, to an envelope-type covering and method of using the same. While the covering is particularly adapted for use as a frost protector, it may also be used for bird and insect control and, in certain cases, for accelerating fruit maturity.

U.S. Pat. No. 1,820,040, issued Aug. 25, 1931, to Zuckerman, discloses a protective envelope for trees of the general type that is the subject of this invention. This patent illustrates an envelope having an open bottom and closed top with a lifting means affixed to the closed top by which the envelope may be lifted to a position above the tree and thereafter lowered onto it. The bottom or mouth of the envelope is kept open during installation by a circular band of spring steel or the like. Once installation has been completed, the band is removed and a drawstring tightened to close the mouth or bottom of the bag about the trunk of the tree. A small lamp is then placed within the envelope through means of a suitable access opening. The function of the lamp, of course, is to heat the air within the envelope and thus prevent frost damage.

The Zuckerman patent does not address specifically the manner in which the envelope is to be removed from the tree when no longer needed. Removal would be effected, presumably, by loosening the drawstring and thereafter lifting the envelope upwardly in much the same manner as it had initially been placed over the tree. This method of removal would not necessitate reattachment of the spring steel member which had held the mouth or bottom of the envelope open during installation. It could, however, cause serious damage to the tree, particularly delicate blossoms and fruit, due to the frictional contact of the interior of the envelope therewith during the removal process. It would also necessitate fabrication of the envelope from fairly heavy material to minimize tearing of the envelope during the removal process. And, of course, the heavier the envelope material, the more likely damage to the tree during removal of the envelope.

SUMMARY OF THE INVENTION

It is an object of this invention to provide an envelope and method of using the same which does not have the inherent disadvantages of the envelope and method of installation and removal shown in the aforenoted Zuckerman patent. It is an object of this invention, more particularly, to provide such an envelope and method of using the same wherein removal may be effected without significant damage to the tree, its blossoms or its fruit and wherein, in most cases, residual ground heat can be utilized to maintain the air temperate therewithin despite the existence of freezing conditions on the exterior. It is a further object of this invention to provide such an envelope and method of using the same wherein the envelope may be fabricated from relatively lightweight material with minimal danger of tearing, etc., during removal, thus further decreasing the chance that damage will be done to the tree during the removal process.

The method which is the subject of this invention comprises the steps of providing a covering including a flexible envelope having an open bottom and a closed top with means permanently (in the sense the means is not removed after installation of the covering) fixed to the envelope around the open bottom thereof for holding it open. Lifting means are provided on the closed top of the envelope from which the covering can be suspended above a tree.

Once the covering, which also is the subject of this invention, has been suspended above a tree by the lifting means, it is lowered onto the tree. This lowering may be effected by releasing the upward force retaining the covering in position above the tree instantly, permitting it to envelope the tree in parachute-like fashion or by lowering it slowly, maintaining an upwardly directed restraining force continuously.

When the need for the covering has passed, it is removed by exerting upward forces from the open bottom of the envelope. This causes the covering to reverse peel smoothly with minimal catching and/or tearing of the material—i.e., turn progressively inside—out—from the tree, minimizing damage to branches, blossoms and/or fruit and the cover.

BRIEF DESCRIPTION OF THE DRAWINGS

FIG. 4 is a perspective view illustrating the method of removing the cover;

FIG. 5 is a plan view illustrating one segment of a suitable peripheral ring which may be utilized to hold the bottom or mouth of the envelope open; and FIG. 6 is a fragmentary perspective illustrating the manner of attachment of the removal lines to the cover during the removal process.

DETAILED DESCRIPTION OF THE PREFERRED EMBODIMENT

Figure 3:
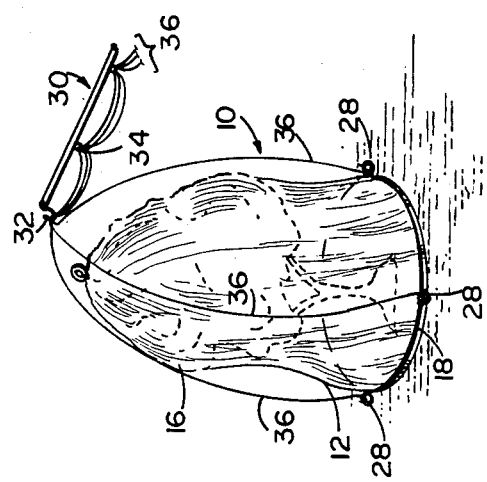
FIG. 3 is a perspective view illustrating the cover on the tree just prior to removal.

The cover 10 which is the subject of this invention includes a flexible fabric envelope 12 which may be of any desired configuration so long as it has an open bottom and a closed top. While illustrated, thus, as generally conical in configuration, it could just as well take the shape of a cylinder or, for that matter, a paper grocery bag—i.e., rectangular in cross section.

Envelope 12 is made from any of several available tough, lightweight fabrics which are capable of breathing, admitting light and retaining heat. One such fabric is manufactured by E. I. DuPont de Nemours & Company, of Wilmington, Delaware, and marketed under the trademark REMAY. Another suitable material is that used by Kimberly-Clark for its "floating row covers."

Envelope 12 has an open bottom 14 and a closed top 16. The bottom 14 is retained open by means of the attachment thereto of a circular ring 18. Where the open bottom or mouth 14 is circular, as shown, ring 18 may conveniently be made from a number of segments 22 of spring steel suitably affixed together at apertures 24 by means of stove bolts, rivets or the like. It could also, as will be readily appreciated by those skilled in the art, be fabricated from any of a number of other available materials including plastic. It is preferred that it be segmented as shown in the preferred embodiment for shipping purposes.

Ring 18 may be affixed to the periphery of the open bottom of envelope 12 in any convenient and conventional fashion. It may, for example, be run through a hem, be glued, held by hog rings or the like. It is not necessary that, once affixed to the envelope, it be readily removable since this invention contemplates its continued attachment to the envelope during all periods of use.

An eye 26, which may take the form of a simple metal ring, is affixed to envelope 12 centrally at its closed top. The flexible fabric of the envelope may be reinforced at this area to increase the service life of cover 10. A similar eye 26, not shown, can be placed on the opposite side of the fabric so as to render cover 10 useable directly regardless of its "inside-out" or "outside-in" condition prior to installation upon a tree.

At least three other eyes 28, which may be similar, are positioned about the lower periphery of cover 10 and, preferably, pass through suitable apertures in circular ring 18. These eyes are utilized during removal of the cover from the tree as will be explained in detail hereinafter. They may also be utilized to affix the open mouth or bottom of the cover 10 to the ground by means of stakes or the like in high wind conditions.

Figure 2:
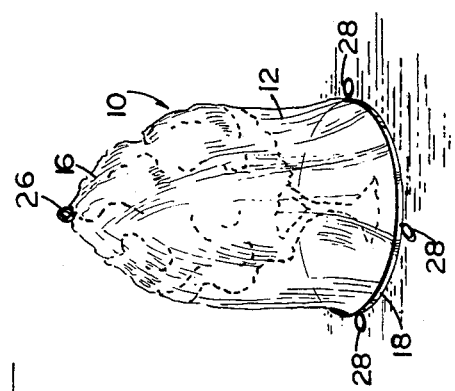
FIG. 2 is a perspective view illustrating the cover installed.
Figure 1:
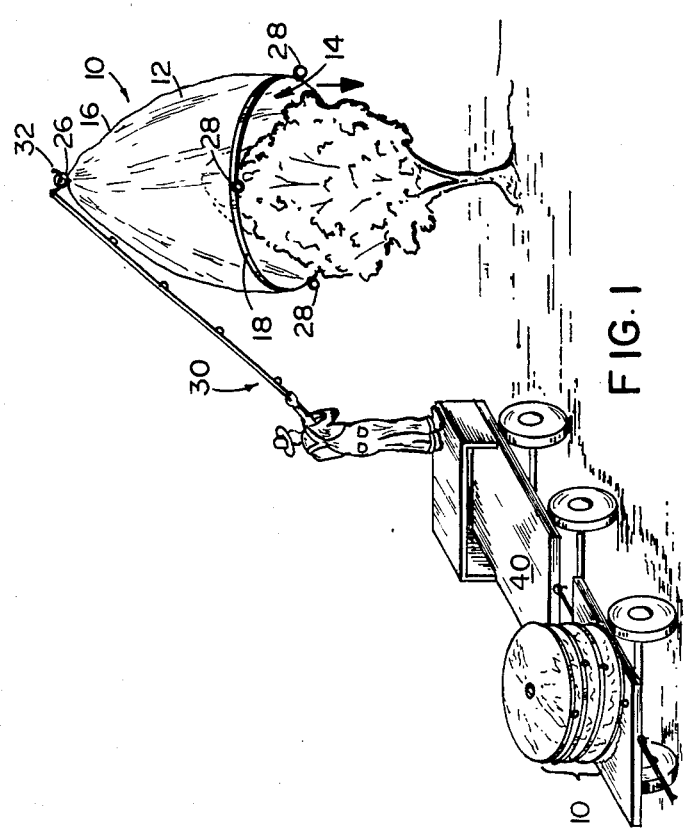
FIG. 1 is a perspective view illustrating the method of installing and the cover which is the subject of this invention.

A plurality of the covers 10, as shown specifically in FIG. 1, may be stacked upon a suitable utility trailer 40 which is pulled adjacent the trees during installation and removal of the covers by any appropriate vehicle. Installation and removal may be effected, for illustrative purposes, by use of a pole 30 having a hook 32 at the extremity thereof. This hook, which lies in a plane perpendicular to the longitudinal axis of the pole, is slipped through eye 26, the cover 10 brought to an elevated position above the tree to be enveloped and the rod 30 rotated so as to release the hook 32 from the ring 26. When this is done the cover settles downwardly in parachute-like fashion. Alternatively, of course, the pole 30 may be lowered gradually. The covering is sized, in either event, such that the ring 18 contacts the ground, FIG. 2, at all points about its periphery once installation is completed. This permits the utilization of retained heat from the ground immediately surrounding the tree for purposes of warming the air within the envelope and, thus, preventing freezing of the blossoms or fruit. If extremely cold temperatures are expected, a supplemental source of heat, such as that shown in the aforenoted patent to Zuckerman, may be utilized.

Once the conditions which necessitated installation of the covers 10 have passed, they may be removed by affixing three lines 36 to eyes 28 by means of hooks 38. The three lines 36, conveniently, can pass over hook 32 on rod 30 and downwardly through the eyelets 34 to a reel (not shown). As force is exerted on lines 36, as shown in FIG. 4, the circular ring 18 moves upwardly and "reverse peels" the cover from the tree. This "reverse peeling," or turning inside-out of the envelope 12, minimizes damage which would occur to the tree were a removal process such as that contemplated in the aforenoted Zuckerman patent utilized. It also subjects the cover to minimal abrasion, poking, etc., from the tree branches, permitting fabrication of the same from a lighter weight material than would be the case if the Zuckerman method of removal were utilized. Once removal has been completed, the cover 10 is restacked on the trailer 40 for reuse at a later time if necessary.

Installation and removal of the cover may be effected, of course, using means other than the illustrated rod. It could, for example, be dropped and retrieved from the basket of a "cherry picker," fork-lift or the like.

While a preferred embodiment of this invention has been described in detail, it will be readily apparent to those skilled in the art that other embodiments may be conceived and fabricated without departing from its spirit and scope. Such other embodiments are to be deemed as included within the scope of the appended claims unless these claims, by their language, expressly state otherwise.

The embodiments of the invention in which an exclusive property or privilege is claimed are defined as follows:

1. A method of enveloping a tree and the like with a covering and thereafter removing the same when it is no longer needed, said method comprising the steps of: providing a covering including a flexible envelope having an open bottom and a closed top; ring means affixed to said envelope around the open bottom thereof for holding said bottom open; and lifting means on the closed top of said envelope from which said covering can be suspended above a tree; suspending said covering above a tree by said lifting means; lowering said covering over said tree; leaving the covering on said tree until it is no longer needed; and thereafter removing said covering by exerting upward forces on the ring means at the open bottom of said envelope to reverse peel it from said tree.

2. The method as set forth in claim 1 which further comprises the step of sizing said covering with respect to the tree which it is to envelop such that said ring means rests on the ground when said lowering step has been completed, whereby residual heat in the ground will warm the interior of said covering and the tree which it envelops during periods of cold weather.

3. The method of claim 1 wherein said removing step comprises the steps of attaching at least three flexible lines to said ring means at spaced points therealong and thereafter lifting said lines upwardly until said envelope is turned inside-out and no longer envelops the tree.

4. A method of removing a covering from a tree and the like, said covering including a flexible envelope having an open bottom and a closed top; ring means affixed to said envelope around the open bottom thereof for holding said bottom open; the method comprising the steps of removing said covering by exerting upward forces on the ring means at the open bottom of said envelope until said covering is turned substantially completely inside out, thereby reverse peeling it from the tree.

5. The method as set forth in claim 4 wherein said raising step includes the steps of affixing to said cover at the open bottom thereof at least three flexible lines from a point above the closed top of said cover.

* * * * *